United States Patent [19]

Mendelsohn

[11] 4,344,006
[45] Aug. 10, 1982

[54] EPOXY-ELASTOMER LOW TEMPERATURE CURABLE, SOLVENTLESS, SPRAYABLE, STATOR WINDING ADHESIVE-BRACING COMPOSITIONS

[75] Inventor: Morris A. Mendelsohn, Wilkins Township, Allegheny County, Pa.

[73] Assignee: Westinghouse Electric Corp., Pittsburgh, Pa.

[21] Appl. No.: 278,523

[22] Filed: Jun. 29, 1981

Related U.S. Application Data

[62] Division of Ser. No. 134,730, Mar. 28, 1980, Pat. No. 4,298,656.

[51] Int. Cl.³ ............................................. H02K 15/12
[52] U.S. Cl. ........................................ 310/43; 310/45; 427/104; 427/421; 428/418; 428/462; 428/463
[58] Field of Search ................ 427/104, 421; 428/414, 428/416, 418, 462, 463; 310/43, 45, 260

[56] References Cited

U.S. PATENT DOCUMENTS

| | | | |
|---|---|---|---|
| 3,436,569 | 4/1969 | Flaherty et al. | 310/260 |
| 3,792,299 | 2/1974 | Hallerbäck | 310/43 |
| 4,055,541 | 10/1977 | Riew | 528/119 |
| 4,088,708 | 5/1978 | Riew | 525/113 |

*Primary Examiner*—Sam Silverberg
*Assistant Examiner*—Richard Bueker
*Attorney, Agent, or Firm*—D. P. Cillo

[57] ABSTRACT

A sprayable, solventless bracing composition is made from the admixture of 100 parts of bisphenol A epoxy resin, up to about 8 parts of a coloring pigment, about 0.5 to about 4 parts of a thixotropic agent, about 100 to about 200 parts of butadiene/acrylonitrile polymer, and about 20 to about 40 parts of an amine terminated curing agent.

7 Claims, 1 Drawing Figure

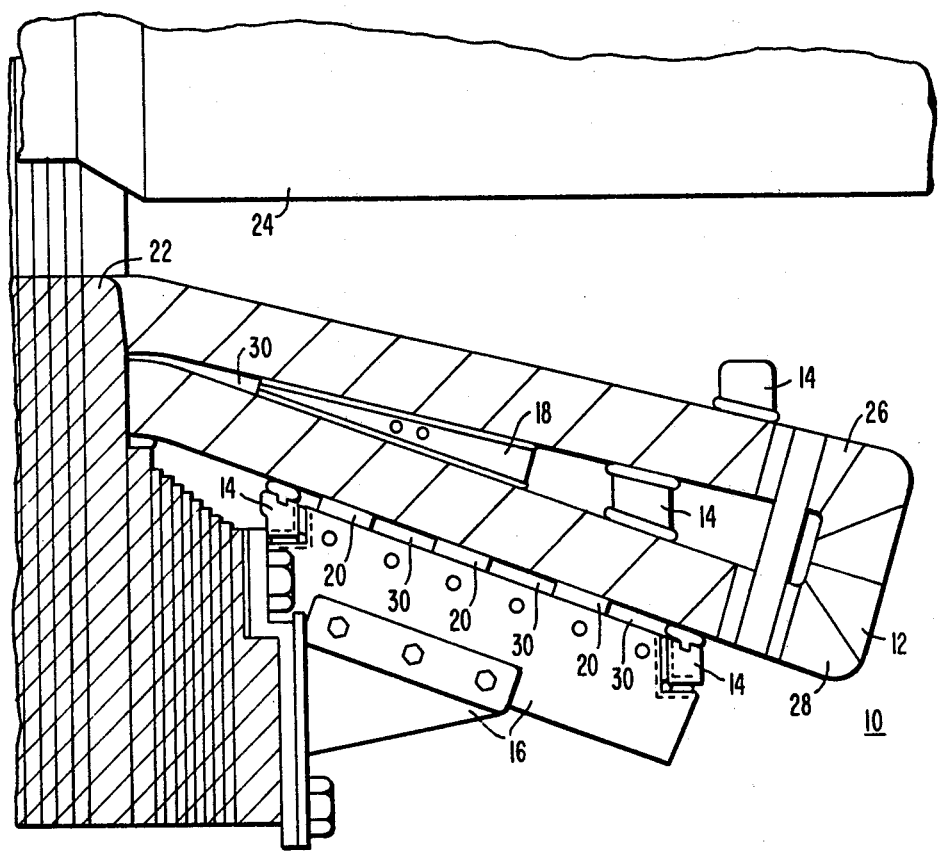

EPOXY-ELASTOMER LOW TEMPERATURE CURABLE, SOLVENTLESS, SPRAYABLE, STATOR WINDING ADHESIVE-BRACING COMPOSITIONS

This is a division of application Ser. No. 134,730, filed Mar. 28, 1980, now U.S. Pat. No. 4,298,656.

BACKGROUND OF THE INVENTION

Coatings for stator end windings of turbine generators must aid in absorbing vibration and in helping to secure the end windings, so that they will not move relative to one another during operation of the generator. In addition, the coating must have outstanding abrasion resistance, toughness, flexibility and thermal aging characteristics. It should also be nontoxic, easily applied in thick sections, curable at about 25° C. within about 10 hours, have a low odor, and be attractive in order to provide a cosmetic covering over the end winding assembly.

Bracing coatings have been tested for this application containing about 95 parts of bisphenol A epoxy resin; 5 parts of a diluent such as a diglycidyl ether of an aliphatic diol; 2 parts of $Fe_2O_3$ pigment; and 20 parts of amine curing agent. Such coatings have lacked toughness and good thermal aging characteristics: the flexibility of ⅛ inch thick samples lasting only from about 1 to 10 days at 100° C. before cracking upon being bent around a 2 inch diameter mandrel, with a weight loss at the time of failure of from about 1.5 percent to 20 percent.

In order to impart resiliency and toughness to normally rigid epoxy castings, Lee and Neville, in the *Handbook Of Epoxy Resins*, 1967, Chapter 16—16, reports the use of acrylonitrile-butadine polymers. B. F. Goodrich Chemical Co., in a 1976 product brochure entitled "Hycar ATBN Elastomers" describes secondary amine terminated butadiene/acrylonitrile (ATBN) reactive liquid polymers, having a 2-butenylene:cyanoethylene chain segment ratio of about 5:1, as tougheners for epoxy resins when used at levels below 10 parts/100 parts epoxy, as flexibilizers for epoxy resins when used at levels above 20 parts/100 parts epoxy, and as curing agents for epoxy resins when used at levels above 150 parts/100 parts epoxy.

These ATBN materials may be used with solvents, such as xylene, methyl ethyl ketone or toluene. Such epoxy-ATBN compositions, however, while substantially upgrading flexibility of ⅛ inch thick samples to about 90 days at 100° C. before cracking upon being bent around a 2 inch diameter mandrel, with weight losses ranging from about 1.8 percent to 4.1 percent at the time of failure, still do not exhibit all of the essential qualities required of stator end winding coatings.

Riew, in U.S. Pat. No. 4,055,541, taught room temperature curable compositions containing non-cycloaliphatic epoxy and from 1 to 1,000 parts/100 parts epoxy of an amine-terminated ATBN liquid polymer. Catalyst and curing agents are optional, and can comprise $BF_3$-amine complexes, imidazoles and triethylenetetramine. Up to 50% filler is allowed and solvents such as kerosine, toluene, benzene and the like can be used. Fillers include carbon blacks, carbonates, silicates, glass, asbestos, textile fibers, metal oxide colorants. Plasticizers, such as castor oil, silicones, phthalates, sebacates and trimellitates are also taught. Suggested uses include spraying, casting, painting or dipping applications, to provide 1 to 100 mil coatings on substrates such as tire sidewalls. Other uses include molded gears, appliance housings and electrical circuit boards.

What is needed, however, is a composition formulated specifically as a solventless stator adhesivebracing composition. This composition must have outstanding toughness, flexibility, thermal aging, insulating and short cure characteristics. For example, continued flexibility of ⅛ inch thick samples to over about 250 days at 100° C. before cracking upon being bent around a 2 inch diameter mandrel, weight losses of below about 1.25 percent after 250 days, and 10 hour curing properties at 25° C. The material should also be sprayable in thick coatings.

SUMMARY OF THE INVENTION

It has been discovered that sprayable, solventless, stator winding adhesive-bracing compositions can be made, comprising: (A) 100 parts by weight of diglycidyl ether of bisphenol A epoxy resin having an epoxy equivalent weight (E.EQ.WT.) between about 160 and about 260, and a viscosity between about 3,000 cps. and about 6,000 cps. at 25° C.; (B) 0 to about 30 parts by weight of a diglycidyl ether of an aliphatic diol having from 2 to 12 carbon atoms, preferably diglycidyl ether of neopentyl glycol (DGENPG), as an epoxy reactive diluent having a viscosity between about 5 cps. and about 100 cps. at 25° C.; (C) 0 to about 8 parts by weight of a coloring pigment, preferably iron oxide; (D) about 0.5 to about 4.0 parts by weight of a thixotropic agent, preferably submicroscopic $SiO_2$, having an average particle size of between about 0.005 micron and about 0.05 micron; (E) about 100 to about 200 parts by weight of a secondary amine terminated butadiene/acrylonitrile (ATBN) reactive liquid polymer. This ATBN polymer will have a 2-butenylene:cyanoethylene chain segment ratio of between about 3:1 and about 7:1, and a viscosity at 27° C. of between about 150,000 cps. and about 180,000 cps., functioning as a co-reactant chain extender for the bisphenol A epoxy resin; (F) about 0 to about 40 parts by weight of a plasticizer-diluent for the ATBN polymer; (G) about 20 to about 40 parts by weight of an amine terminated curing agent not containing cyanoethylene chain segments; and (H) 0 to about 8 parts by weight of a $BF_3$-amine complex, preferably containing p-chloroaniline and triethylene glycol, functioning as a co-curing agent. No solvents are used or desired.

Preferably, ingredients (A), (B), (C) and (D) are mixed together, and ingredients (E), (F), (G) and (H) are mixed together, to provide a two component system. The two components can be mixed and applied manually to coat substrates, such as plastics, wood, metal sheets, dynamoelectric machine windings such as stator windings, coils, armatures, etc., or applied through high pressure, hot spray equipment. The composition has adhesive properties, dries within about 3 hours, and polymerizes to a complete cure within about 10 hours at 25° C. This cure rate is slow enough for application through spray equipment and subsequent penetration into the voids between the plurality of stator end windings, and yet sufficiently rapid so that the coating composition dries before it would become contaminated from particulate matter in the atmosphere.

Rheological characteristics of the coating composition are such that it can be applied in thick sections, so as to fill large gaps without running. The coating composition can be applied by spraying in thicknesses ranging from those of films of the order of 100 microns to essentially thick sections of about 60 mils (0.06"). Avoiding the use of a solvent is advantageous since problems associated with voids resulting when the solvent evaporates, ventilation, toxicity of solvent vapors and governmental air pollution regulations are eliminated. Savings in energy costs result since heating is not required to vaporize solvent or to set up the resin. The coating composition is essentially odorless and has been found to be nonmutagenic on toxicologic tests. Upon curing, the coating composition is tough, abrasion resistant, and flexible, and thermal aging tests have indicated that it displays extremely good crack resistance and longevity at the elevated operating temperatures of water coiled turbine generators.

BRIEF DESCRIPTION OF THE FIGURE

For a better understanding of the invention, reference may be made to the exemplary embodiments shown in the accompanying drawing, which shows a sectional view of one embodiment of a generator stator coil, along with associated bracing components and rotor.

DESCRIPTION OF THE PREFERRED EMBODIMENTS

The base epoxy resin which is useful in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principle product may be represented by the chemical structural formula:

where n is an integer of the series 0, 1, 2, 3 ..., and R is:

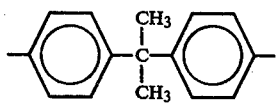

to provide a diglycidyl ether of bisphenol A type epoxy resin. These epoxies generally have viscosities of from about 2,000 cps. to about 15,000 cps. at 25° C.

These bisphenol A epoxy resins can be further characterized by reference to their epoxy equivalent weight (E.EQ.WT.), which is defined as the mean molecular weight of the particular resin divided by the mean number of epoxy radicals per molecule. In the present invention, all of the suitable bisphenol A epoxy resins will have a preferred epoxy equivalent weight of from about 160 to about 260. These epoxy resins are well known and commercially available. Further reference can be made to Lee and Neville, *Handbook Of Epoxy Resins*, McGraw-Hill, 1967, Ch. 2. Novolac and cycloaliphatic epoxy resins are not useful in the compositions of this invention because of their inflexibility on cure.

The other resin useful in this invention is a diglycidyl ether of an aliphatic diol having from 2 to 12 carbon atoms. These are low viscosity resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, and diglycidyl ethers of polyether glycols, such as for example, diglycidyl ethers of triethylene glycol and diglycidyl ethers of tetraethylene glycol and their mixtures. These resins have viscosities of from from about 5 cps. to about 100 cps. at 25° C.

DGENPG is the preferred resin of this type. DGENPG is prepared by a two step process. The initial step reacts neopentyl glycol and epicholorohydrin in the presence of BF$_3$ to produce a chlorohydrid intermediate which is then dehydrohalogenated by sodium hydroxide or sodium aluminate to provide:

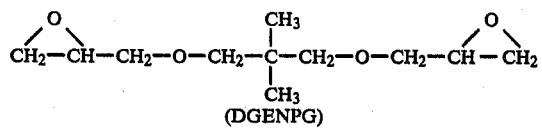

(DGENPG)

These materials are used as reactive diluents. They are optional ingredients that can be added up to about 30 parts, preferably about 5 to about 10 parts by weight/100 parts of bisphenol A epoxy resin.

A thixotropic agent, preferably submicroscopic silica (SiO$_2$), having an average particle size of between about 0.005 micron to about 0.05 micron, is essential in the coating composition of the invention. The submicroscopic silica is a fumed silica consisting of vast numbers of individual particles which group together in a chain-like formation. These chains are branched and have external surface areas of between about 50 square meters/gram and about 400 square meters/gram. Each particle in the chain has —OH groups attached to the silicon atoms on the particle surface. When added to liquids of medium or high polarity, the —OH groups on the fumed silica surface tend to bond to the liquid. Particles of the fumed silica will also hydrogen bond to themselves, to form a lattice network providing a thickening action. Upon agitation or shear, the lattice structure breaks down and re-forms after agitation stops. This reversal in the flow behavior of the liquid is thixotropy.

The thixotropic agent is critical to providing compositions useful for coating stator end windings, and must be used in the weight range of between about 0.5 part and about 4.0 parts/100 parts of bisphenol A epoxy resin. The thixotropic agent functions with the epoxy and the butadiene-acrylonitrile used in this system in a manner not completely understood, performing not only thixotroping but also thickening and stabilizing functions. Under about 0.5 part, too little thixotroping is accomplished. Over about 4.0 parts and thickening is increased excessively, making application of the coating compositions difficult. Thixotropic agents other than fumed silica are well known in the art and useful in this invention. As an optional coloring agent, up to about 8 parts, preferably about 4 to about 7 parts by weight of pigment, preferably an iron oxide such as Fe(III) oxide, for example Fe$_2$O$_3$ can be used per 100 parts of bisphenol A epoxy resin. The pigment provides a smooth glossy coating. Over about 8 parts causes an excessive increase in viscosity.

The essential flexibilizing chain extender co-reactant for the bisphenol A epoxy resin in this invention, is a high viscosity, secondary amine-terminated butadiene/acrylonitrile (ATBN) reactive liquid polymer. This ATBN polymer has 2-butenylene (butene type) segments or groups and cyanoethylene (ethyl nitrile type) segments or groups, where the repeating units were prepared from about 13 weight percent to about 25 weight percent acrylonitrile by weight of the chain segments of the polymer. The useful ATBN polymer in this invention has a critical 2-butenylene:cyanoethylene chain segment ratio, of between about 3:1 and about 7:1 and a viscosity at 27° C. of between about 150,000 cps. and about 200,000 cps. This material has the chemical formula:

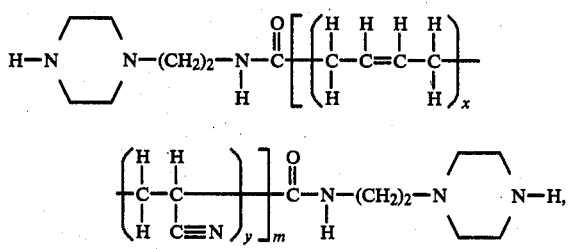

where x=3 to 7, preferably 5, y=1 and m=7 to 13, generally 10.

The ATBN polymer has reactive amide and secondary amine groups. Most of the bisphenol A epoxy reacts with the terminal amine groups. The 2-butenylene groups, herein defined as —CH$_2$—CH=CH—CH$_2$—, can vary from about 3 to about 7 for each cyanoethylene group, containing a nitrile —C≡N bond, herein defined as

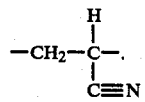

Over about seven 2-butenylene groups/each cyanoethylene group, the ATBN can be degraded more easily by heat, causing toughness and long term thermal aging characteristics in the cured coating to drop dramatically. Under about three 2-butenylene groups/each cyanoethylene group, flexibility in the cured coating will suffer. The ATBN is used in the weight range of between about 100 parts and about 200 parts/100 parts of bisphenol A epoxy resin. Over 200 parts, the viscosity of the coating composition will become unmanageable, making application very difficult or impossible. Under 100 parts, the necessary flexibilizing of the base epoxy will not be achieved. These ATBN materials are well known and commercially available.

Optionally, a suitable plasticizer can be used with the ATBN polymer. This plasticizer will act to reduce the viscosity of the ATBN and make the coating composition easier to apply through a spray apparatus. Any well known rubber plasticizer can be used, such as, for example, alkyl and aromatic phthalates, azelates, fumarates and sebacates, such as dioctyl phthalate, dioctyl azelate, dioctyl fumarate, diethyl hexyl sebacate (Bis (2-ethyl hexyl) sebacate), and the like. These materials should have a molecular weight over about 200, so that they are not highly volatile and will not harm the high temperature weight loss characteristics of the coating composition. An effective amount of the plasticizer will be between about 0 and 40 parts, preferably about 5 to about 35 parts by weight/100 parts by weight of bisphenol A epoxy resin.

An amine terminated curing agent not containing cyanoethylene chain segments is used with the amine terminated butadiene-acrylonitrile copolymer. The amine terminated curing agent has one or more terminal amine groups, i.e., —CR$_2$NHR', containing at least one active hydrogen attached to the nitrogen atom, where R and R' are selected from H, and alkyl groups having from 1 to 18 carbon atoms. Preferably, the curing agent will have two or more terminal amine groups per molecule. The terminal —CR$_2$NHR' group or groups can be attached to a variety of structures, such as alkyl groups having from 1 to 18 carbon atoms, for example:

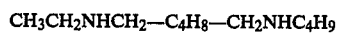

(N-ethyl, N'-butyl hexanediamine: mol. wt.=200). The terminal group or groups can also be attached to an imidazole type structure to provide polyamines, for example:

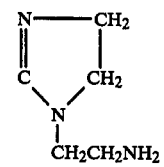

(Fatty imidazoline polyamine: mol. wt.=112). The terminal group or groups can also be attached to amide groups which in turn may be attached to a carbocyclic structure, for example:

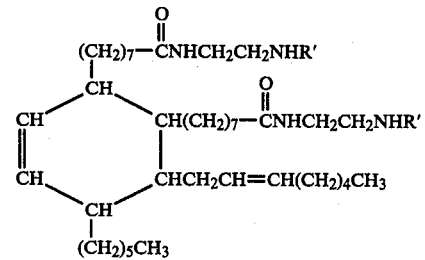

(Fatty polyamide polyamine: mol. wt.=644+). where R' can equal H, and alkyl groups having from 1 to 18 carbons. This is the preferred curing agent of the invention.

The fatty imidazoline polyamine can be made by reacting a fatty acid with a polyamine at 285° C. to 315° C. The fatty polyamide polyamine can be made by reacting 9, 12 lineoleic carboxylic acid with 9, 11 linoleic carboxylic acid, in a Diels Alder condensation, to form a linoleic acid dimer, one mole of which is then reacted with two moles of ethylene diamine, to form the product. These reactions are described in further detail in Lee and Neville, *Handbook Of Epoxy Resins*, 1967, Chapters 10—5 and 10—6.

The useful amine terminated curing agent can contain ring structures, and ester, imide and amide groups and the like, along with alkyl groups. These curing agents must have a molecular weight range over 90, preferably between about 90 and about 2,000, and most preferably between 100 and 1,200. Under 90, excess volatility will cause loss of material prior to cure of the polymer and therefore inadequate physical properties. Over 2,000, the viscosity of the material is too high for its application with spray equipment. The amine terminated curing agent is used in the weight range of between about 20 parts to about 40 parts/100 parts bisphenol A epoxy resin. Over 40 parts, the coating composition becomes stiff and difficult to apply within acceptable time limits. Under 20 parts, polymerization and cure will extend beyond about 16 hours at 25° C.

An optional co-curing agent, consisting of a $BF_3$-amine complex, preferably containing p-chloroaniline and triethylene glycol, can be used with the main amine terminated curing agent. The preferred complex contains, by weight, about 0.4 to 1.2 parts $BF_3$.p-chloroaniline, about 0.1 to 0.6 part p-chloroaniline, and about 2 to 4 parts triethylene glycol. Use of this material up to about 8 parts, preferably about 2 to about 5 parts by weight/100 parts bisphenol A epoxy resin will be an amount effective to allow faster cure and more control of the drying time of the coating composition.

The combination of the ingredients described hereinabove, in the critical weight ranges specified, provides a coating composition that can be used to brace a plurality of assembled stator end windings or to coat other substrates such as flat or coiled conductors. The coatings have a variety of unexpected and contradictory properties, including room temperature complete cure within about 8 hours, extremely good toughness, flexibility and bending characteristics at high temperatures, minimal weight loss at high temperatures, ability to form thick coatings and little odor upon application. Addition of other materials, or deletion of the above-described essential ingredients, will provide compositions deficient in one or many of the outstanding properties described. Solvents are specifically excluded from these coating compositions.

In the method of this invention, the liquid bisphenol A epoxy resin, thixotropic agent, and, if used, optional epoxy diluent and optional pigment, are mixed in a high speed high shear mixer, such as a Cowles or a Premier Mill Dispersator. Ball milling is another effective mixing means. The remainder of the ingredients comprise the co-reacting curing system. Preferably, the liquid $BF_3$.p-chloroaniline-triethylene glycol complex is formed, if it is to be used, and then mixed with the liquid amine terminated butadiene-acrylonitrile copolymer and the liquid amine terminated curing agent in similar mixing means as described above.

This provides a two component system. The components are then mixed in a suitable mixing means to provide a coating composition having a viscosity between about 15,000 cps. and about 60,000 cps. at 25° C. The composition can be applied manually to substrates with a spatula, etc. or applied through a pumping, mixing means, such as high pressure, hot spray equipment. Viscosities under about 15,000 cps, or with use of solvent, the composition will sag and not coat in thick sections. Over about 60,000 cps., the composition will be extremely difficult to apply.

The preferred means of application is through spray equipment capable to up to 100° C. preheating, and pressure application of about 500 to 3,000 psi. Excellent results are achieved if the resin component is preheated to about 75° C., the co-reacting curing component is preheated to about 95° C. to 100° C., and the two are mixed in a spray apparatus, without solvent, under a material pressure of about 2,000 to 3,000 psi, with an airless spray tip having an orifice of about 30 mils (0.03").

Referring now to the Drawing, one type of generator stator end winding 10 is shown, covered by tape or other suitable insulation 12, and supported by top, middle and bottom support rings 14, the bottom rings being mounted on support bracket 16. Various blocking members 18, and expansion supports 20 are also shown. The stator core assembly 22 is shown with rotor assembly 24 mounted to rotate within the stator core assembly. Extending from the stator core assembly 22 is the radially inner or top conductor bar 26 and radially outer or bottom conductor bar 28. These conductor bars are bent radially outward as they leave the stator slots in order to provide sufficient room for the rotor assembly 24.

Each of these inner bars and outer bars must be rigidly supported to prevent movement due to the magnetic forces operating on them and must be adequately separated and insulated from adjacent conductor bars, not shown. A variety of small openings 30 are shown where dust could accumulate and eventually cause tracking problems. The adhesive-bracing composition of this invention is intended to coat and further insulate the entire stator end winding assembly 10, covering the insulation on the conductor bars 26 and 28 and the blocking members 18, preventing movement of the blocks and chipping or abrasion of the insulation. The coating composition also coats the expansion supports 20 and aids in helping damp out and absorb vibrations.

The coating can fill the small openings 30, to help prevent tracking and further secure the stator assembly to its support. The coating further coats between the plurality of end windings in the stator assembly, bracing them together and providing an attractive overcoat for the entire stator end winding assembly and support system. As can be seen, a sprayable coating would be highly advantageous.

EXAMPLE 1

Five sample compositions were prepared: Sample (A) contained 95 parts by weight of a liquid diglycidyl ether of bisphenol A epoxy resin, having an epoxy equivalent weight (E.EQ.WT.) of 172 to 176 and a viscosity of 4,000 to 5,500 cps. at 25° C. (sold commercially by Dow Chemical Co. under the tradename DER 332); 5 parts by weight of diglycidyl ether of neopentyl glycol (DGENPG) reactive epoxy diluent; 5.7 parts by weight of $Fe_2O_3$ pigment; 1.4 parts by weight of submicroscopic silica thixotropic agent having an average particle size of about 0.015 micron and a surface area of about 190 to 200 square meters/gram (pyrogenic, fumed $SiO_2$ sold commercially by Cabot Corp. under the trade name Cab-O-Sil); 150 parts by weight of a secondary amine terminated butadiene/acrylonitrile reactive liquid polymer containing among the chain segments 17 weight percent from acrylonitrile, having a 2-butenylene:cyanoethylene chain segment ratio of about 5:1 and a viscosity at 27° C. of about 170,000 cps. (sold commercially by B. F. Goodrich Chemical Co. under the trade name HYCAR ATBN 1300X16); 30 parts by weight of fatty polyamide polyamine curing agent having two amine terminal groups; and 4 parts by weight of a $BF_3$ amine complex co-curing agent containing p-chloroaniline and triethylene glycol (sold commercially by Pacific Anchor Chemical Corp. under the trade name Anchor 1170).

Sample (B) contained 100 parts by weight of DER 332 epoxy having an E.EQ.WT. of 172 to 176; 5.7 parts by weight of $Fe_2O_3$ pigment; 1.4 parts by weight of fumed $SiO_2$ having an average particle size of about 0.015 micron; 150 parts by weight of HYCAR ATBN 1300X16 containing among the chain segments 17 weight percent from acrylonitrile and a 2-butenylene:-cyanoethylene chain segment ratio of about 5:1, 30 parts by weight of fatty polyamide polyamine curing agent having two amine terminal groups; and 4 parts by weight of Anchor 1170 co-curing agent.

Sample (C) contained the same ingredients in the same parts by weight ratio as Sample (A), except that 30 parts by weight of diethyl hexyl sebacate plasticizer-diluent for the ATBN was included.

Comparative Sample (D) contained the same ingredients in the same parts by weight ratio as Sample (B), except that a secondary amine terminated butadiene/acrylonitrile reactive liquid polymer containing among the chain segments about 10 weight percent from acrylonitrile, having a 2-butenylene:cyanoethylene chain segment ratio of about 10:1 and a viscosity at 27° C. of about 132,000 cps. (sold commercially by B. F. Goodrich Chemical Co. under the trade name HYCAR ATBN 1300X21) was used instead of the HYCAR ATBN 1300X16 which had 17 weight percent acrylonitrile and a butene:ethyl nitrile chain segment ratio of about 5:1.

Comparative Sample (E) contained 70 parts by weight of DER 332 epoxy having an E.EQ.WT. of 172 to 176; 30 parts by weight of DGENPG epoxy diluent; 150 parts by weight of HYCAR ATBN 1300X16 containing among the chain segments 17 weight percent from acrylonitrile and a 2-butenylene:cyanoethylene chain segment ratio of about 5:1; 30 parts by weight of fatty polyamide polyamine curing agent having two amine terminal groups; and 4 parts by weight of Anchor 1170 co-curing agent. No fumed $SiO_2$ was used.

In all of the above Samples, the DER 332 and the DGENPG, Cab-O-Sil and $Fe_2O_3$, when used, were mixed together in a high speed high shear Premier Mill Dispersator with a 1⅛" blade for about 5 minutes, to provide homogeneously mixed resin component. The resin components had viscosities of between about 320 cps. and about 7,200 cps at 25° C. The HYCAR ATBN, fatty polyamide polyamine curing agent Anchor 1170, and plasticizer when used were similarly mixed together for about 1 minute, to provide a viscous liquid co-reacting curing component. The coreacting curing components had viscosities of between about 33,000 cps. and about 108,000 cps. at 25° C. The viscous liquid co-reacting curing component was then added to the resin component and the two were mixed in the dispersator for about 3 minutes to provide thick compositions having viscosities between about 20,000 cps. and about 48,500 cps. at 25° C. These compositions had little if any odor.

These five compositions were then degassed for several minutes at a pressure of 1 to 2 Torr and poured into 6¼"×1"×⅛" thick molds which had been preheated to 100° C. The loaded molds were then placed in a forced circulating air oven at 100° C. for 16 hours, to simulate the degree of cure that the coatings would experience after being applied to stator end windings by the time the manufacture of the generators was complete. The molds were taken from the oven, allowed to cool, and then removed from the five sample composition specimens.

Laboratory testing involved comparative evaluation of the thermal endurance of the specimens. Weight loss, hardness and retention of flexibility were measured periodically on specimens aging at 100° C. in forced circulating air ovens. Data was gathered for average values for six replicate specimens for each sample formulation. When the ⅛" thick sample specimens embrittled so that all six of a given sample formulation cracked on bending around a 2" diameter mandrel, the material was considered to have failed. The results are shown in Table 1 below:

TABLE 1

| Sample | Sample Viscosity at 25° C. | Aging Temp. | Days to Crack on Bending Around 2" dia. Mandrel | Weight Loss After Aging for Days Indicated | | | Hardness After Aging for 20 days** |
|---|---|---|---|---|---|---|---|
| | | | | 20d. | 50d. | 300d. | |
| (A) | 40,000 cps. | 100° C. | 395–400 | 1.0 | 1.0 | 1.0 | 54 |
| (B) | 46,200 cps. | 100° C. | 310–320 | 1.0 | 1.0 | 1.0 | 53 |
| (C) | 20,000 cps. | 100° C. | 380–395 | 1.2 | 1.2 | 1.3 | 51 |
| (D)* Low cyanoethylene ATBN | 24,000 cps. | 100° C. | 20–30 | 0.7 | — | — | 41 |
| (E)* No thixotropic agent | 48,500 cps. | 100° C. | 80–90 | 1.4 | 1.7 | — | 39 |

*Comparative Samples
**Shore D Hardness

As can be seen from this data, comparing Sample (B) with comparative Sample (D), only selected ATBN materials having a high cyanoethylene content are effective in stator end winding application, providing a 10× increase in crack resistance properties upon thermal aging. Also, the use of a thixotropic agent is shown to be essential to providing retention of both good flexibility and low weight loss characteristics, comparing Sample (B) which has a 3× increase in crack resistance and much improved weight loss properties over comparative Sample (E). The plasticizer for the ATBN is shown to reduce viscosities by almost ½, as shown in Sample (C), providing more easily sprayable coating compositions.

Samples (A), (B) and (C) were also coated as thin sections on aluminum dishes to observe gel and cure times. All of these samples gelled within 1 hour, dried within about 3 hours and were completely cured within 10 hours at 25° C.

Samples (A), (B) and (C) were also sprayed onto and between a plurality of stator coil end windings comprising a stator assembly using a high pressure, heated spray gun with excellent results. The bracing composition coated and adhered to the coils in coatings about 30 to 60 mils thick, providing a quick curing abrasion resistant, flexible overcoat that would help to damp vibrations, and which would resist chipping or cracking at high temperatures. The spray apparatus used was a Graco Inc. spray system, where the resin component was preheated to 75° C. in one tank and the co-reacting catalyst component was preheated in another tank to 100° C. by heaters operating at 220 V. The two components were mixed in proper proportions and forced through an airless spray tip having a 0.03" orifice and a 60° spray pattern at a material pressure of 3,000 psi. As the coating hit the coil surface, there was enough flow to achieve leveling off without runs or sag.

I claim:

1. A process of coating stator end windings comprising:
    (A) admixing a mixture of:
        (1) 100 parts by weight of diglycidyl ether of bisphenol A resin;
        (2) 0 to about 8 parts by weight of a coloring pigment; and
        (3) about 0.5 to about 4.0 parts by weight of a thixotropic agent, with a mixture of:
        (4) about 100 to about 200 parts by weight of a secondary amine terminated butadiene/acrylonitrile reactive liquid polymer having a 2-butenylene:cyanoethylene chain ratio of between about 3:1 and about 7:1,
        (5) about 20 to about 40 parts by weight of an amine terminated curing agent not containing cyanoethylene chain segments, to provide a solventless composition,
    (B) spraying the composition on a plurality of assembled stator end windings in a turbine generator, and allowing the composition to cure at room temperature, to brace the end windings.

2. The method of claim 1 where the thixotropic agent is $SiO_2$, and has an average particle size of between about 0.005 micron to about 0.05 micron.

3. A generator comprising a stator core assembly, a rotor assembly mounted to rotate within the stator core assembly, and a coated stator end winding assembly, the improvement consisting of the stator end winding assembly coating which comprises the cured admixture of:
    (1) 100 parts by weight of diglycidyl ether of bisphenol A epoxy resin having an epoxy equivalent weight of between about 160 and about 260;
    (2) about 0.5 to about 4.0 parts by weight of a thixotropic agent;
    (3) about 100 to about 200 parts by weight of a secondary amine terminated butadiene/acrylonitrile reactive liquid polymer having a 2-butenylene:cyanoethylene chain segment ratio of between about 3:1 and about 7:1, and a viscosity at 27° C. of between 150,000 cps. and 200,000 cps., and
    (4) about 20 to about 40 parts by weight of an amine terminated curing agent not containing cyanoethylene chain segments.

4. The generator of claim 3, where the coating admixture also contains up to about 8 parts by weight of a coloring pigment, up to about 30 parts by weight of a diglycidyl ether of an aliphatic diol having from 2 to 12 carbon atoms and a viscosity between about 5 cps. to about 100 cps. at 25° C., up to about 40 parts by weight of a plasticizer, for the butadiene/acrylonitrile polymer, having a molecular weight of over about 200, and up to about 8 parts by weight of a $BF_3$-amine complex co-curing agent.

5. The generator of claim 3, where the thixotropic agent in the coating admixture is $SiO_2$, and has an average particle size of between about 0.005 micron to about 0.05 micron, and an external surface area of between about 50 square meters/gram and about 400 square meters/gram.

6. A turbine generator comprising a stator core assembly, a rotor assembly mounted to rotate within the stator core assembly, and a coated stator end winding assembly, the improvement consisting of the stator end winding assembly coating, which is effective to brace the end winding assembly, said coating comprising the cured admixture of:
    (1) 100 parts by weight of diglycidyl ether of bisphenol A epoxy resin having an epoxy equivalent weight of between about 160 and about 260;
    (2) 0 to about 30 parts by weight of a diglycidyl ether of an aliphatic diol having from 2 to 12 carbon atoms and a viscosity of between about 5 cps. and about 100 cps. at 25° C.;
    (3) 0 to about 8 parts by weight of a coloring pigment;
    (4) about 0.5 to about 4.0 parts by weight of $SiO_2$ thixotropic agent;
    (5) about 100 to about 200 parts by weight of a secondary amine terminated butadiene/acrylonitrile reactive liquid polymer having a viscosity at 27° C. of between 150,000 cps. and 200,000 cps., and having the chemical formula:

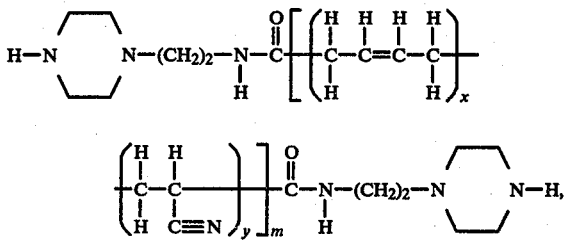

where x=3 to 7, y=1, and m=7 to 13;
    (6) 0 to about 40 parts by weight of a plasticizer for the butadiene/acrylonitrile polymer, having a molecular weight of over about 200;
    (7) about 20 to about 40 parts by weight of an amine terminated curing agent not containing cyanoethylene chain segments; and
    (8) 0 to about 8 parts by weight of a $BF_3$-amine complex curing agent.

7. The turbine generator of claim 6, where the stator end winding assembly comprises a plurality of supported, adjacent, separated, insulated conductor bars.

* * * * *